(12) United States Patent
Dolzhenko et al.

(10) Patent No.: US 10,204,600 B2
(45) Date of Patent: Feb. 12, 2019

(54) STORAGE SYSTEM

(71) Applicant: Apical Ltd, Loughborough (GB)

(72) Inventors: Vladimir Dolzhenko, Loughborough (GB); Alex Kornienko, Loughborough (GB); Metin Gokhan Ünal, Gamston (GB)

(73) Assignee: Apical Ltd., Cambridge (GB)

( * ) Notice: Subject to any disclaimer, the term of this patent is extended or adjusted under 35 U.S.C. 154(b) by 0 days.

(21) Appl. No.: 15/475,960

(22) Filed: Mar. 31, 2017

(65) Prior Publication Data

US 2018/0286361 A1 Oct. 4, 2018

(51) Int. Cl.
*G09G 5/397* (2006.01)
*G09G 5/02* (2006.01)

(52) U.S. Cl.
CPC ............. *G09G 5/397* (2013.01); *G09G 5/022* (2013.01); *G09G 2320/0252* (2013.01); *G09G 2360/127* (2013.01); *G09G 2360/18* (2013.01)

(58) Field of Classification Search
None
See application file for complete search history.

(56) References Cited

U.S. PATENT DOCUMENTS

2006/0290983 A1* 12/2006 Takeda ................ G06F 12/0607
358/1.16
2011/0307459 A1* 12/2011 Jacob (Yaakov) ........ G06T 1/60
707/705

FOREIGN PATENT DOCUMENTS

EP 2395473 A1 6/2011

OTHER PUBLICATIONS

Combined Search and Examination Report dated Sep. 1, 2017 on related United Kingdom Application No. GB1705268.9 filed Mar. 31, 2017.

* cited by examiner

*Primary Examiner* — Kee M Tung
*Assistant Examiner* — Yanna Wu
(74) *Attorney, Agent, or Firm* — EIP US LLP

(57) ABSTRACT

A storage system comprising storage including a plurality of storage banks and a storage controller to control writing of received pixel data to the storage banks in a distribution pattern. The distribution pattern includes pattern sections, each of which corresponds to pixels from a row of input pixels, and pattern blocks, each of which corresponds to pixels from a plurality of adjacent rows and columns of the input pixels. Pixel data in a pattern section and a pattern block are each written to different ones of the storage banks. The pattern section includes a first section part, which overlaps the pattern block and a second section part, which does not overlap the pattern block. Pixel data of the first section part is written to a first set of storage banks and pixel data of the second section part is written to a second, different, set of storage banks.

20 Claims, 3 Drawing Sheets

FIG. 3

STORAGE SYSTEM

TECHNICAL FIELD

The present disclosure relates to a storage system, for example for storing pixel data, and to a method including writing pixel data to storage.

BACKGROUND

It is known to store pixel data, for example relating to pixels of an image, in storage. A known system accesses the pixel data from the storage and processes the pixel data before the image represented by the pixel data is displayed on a display device.

It is desirable to fetch the pixel data in a timely manner to allow the pixel data to be processed and displayed without introducing a noticeable time delay, which may for example adversely affect the display quality experienced by a viewer of the display device.

BRIEF DESCRIPTION OF THE DRAWINGS

Further features will become apparent from the following description, given by way of example only, which is made with reference to the accompanying drawings.

FIG. 3 is a schematic illustration of an example of a distribution pattern including the example distribution pattern of FIG. 2.

DETAILED DESCRIPTION

Figure 1:
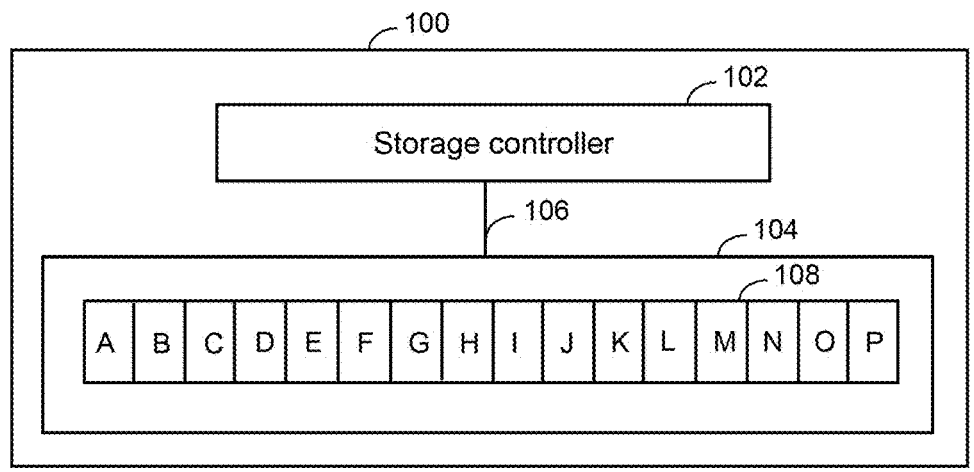
FIG. 1 is a schematic diagram showing an example of internal components of a storage system.

Details of the method and systems according to examples will become apparent from the following description, with reference to the figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a storage system including storage. The storage may be any type of memory or cache and includes a plurality of storage banks, sometimes referred to as memory banks. The storage system is configured to receive, in raster order, pixel data corresponding to a two dimensional area comprising a plurality of rows and columns of input pixels. For example, the storage system receives data relating to rows or lines of pixels on a row-by-row basis. In other words, the storage system receives the pixel data for one row of pixels at a time. The two dimensional area is for example an area of an image including the plurality of rows and columns of input pixels.

The storage system further includes a storage controller operable to control writing of received pixel data to the storage to distribute the received pixel data amongst the storage banks in a distribution pattern. The distribution pattern includes horizontal distribution pattern sections, each of which corresponds to pixels from a row of the input pixels, and two dimensional distribution pattern blocks, each of which corresponds to pixels from a plurality of adjacent rows and a plurality of adjacent columns of the input pixels. The horizontal distribution pattern section includes a first section part, which overlaps the two dimensional distribution pattern block and a second section part, which does not overlap the two dimensional distribution pattern block, as will be described further below with reference to FIGS. 2 and 3.

The storage controller is operable to control the writing of the received pixel data such that pixel data in a horizontal distribution pattern section are written to different ones of the plurality of storage banks such that each of the plurality of storage banks stores pixel data from a first limited number of pixels in the horizontal distribution pattern section. By receiving the pixel data in raster order (for example, one row or line of pixels at a time) and writing pixel data of the horizontal distribution pattern section to different storage banks of the plurality of storage banks, for example by writing subsequent pixels along a row of pixels to different respective storage banks, data relating to a plurality of different pixels may be written to the storage in parallel, for example simultaneously or within a fixed or predetermined time period. This may increase the speed at which the pixel data may be processed.

In addition, the storage controller is operable to control the writing of the received pixel data such that pixel data in a two dimensional distribution pattern block are written to different ones of the plurality of storage banks such that each of the plurality of storage banks stores pixel data from a second limited number of pixels in the two dimensional distribution pattern block. Pixel data of the first section part of the horizontal distribution pattern section is written to a first set of storage banks of the plurality of storage banks and pixel data of the second section part of the horizontal distribution pattern section is written to a second set of storage banks of the plurality of storage banks, different from the first set.

The storage system is also configured to output pixel data corresponding to a selected two dimensional output block including a plurality of rows and columns of output pixels from the input pixels. For example, the selected two dimensional output block may include pixels corresponding to the two dimensional distribution pattern block. The two dimensional output block may correspond with a group or array of pixels which are to undergo further processing before display of an output image or output frame based on the pixel data. For example, the two dimensional output block may correspond with a group of pixels to be interpolated to produce output pixel data corresponding to an output frame for display. For example, the intensity value of a location within the selected two dimensional output block, such as a location corresponding to a non-integer location such as a location between pixels of the selected two dimensional output block, can be interpolated from intensity values corresponding to integer locations in the selected two dimensional output block.

By distributing the pixel data of the output block over different ones of the plurality of storage banks, the pixel data of the output block can be accessed in parallel from the different storage banks, for example over fewer clock cycles than with previous storage systems. Once the pixel data has been accessed, an interpolation can for example be performed. Thus, the interpolation procedure may be carried out more rapidly than with a previous storage system, for example due to the quicker writing of data to the storage system and reading of data from the storage system. As will be appreciated, other processing may be carried out on the pixel data of the selected two dimensional output block than interpolation; interpolation is merely discussed here as an illustrative example.

FIG. 1 is a schematic diagram showing an example of internal components of a storage system 100. The storage system 100 of FIG. 1 includes a storage controller 102. The storage controller 102 may be any module, element, component or circuitry that controls access to storage 104 of the storage system 102 and may be referred to as a memory controller, memory chip controller (MCC) or a memory controller unit (MCU).

The storage controller 102 may be a separate or standalone module or chip or the storage controller 102 may be integrated with another module or chip as part of a larger system, such as a larger system-on-a-chip. For example, the storage system 100 may be part of or integrated with an image processing system or data processing system (as will be discussed further with reference to FIG. 4), with a control module that receives and parses a configuration bit stream and controls other elements or components of the image processing system based on the instructions of the configuration bit stream. In this case, the storage controller 102 may be part of the control module, or the control module may perform the function of the storage controller 102. The storage controller 102 may include or control an address generation unit (AGU), sometimes referred to as an address computation unit (ACU), for calculating addresses used for a processor to access the storage 104. The storage controller 102 is interconnected with the storage 104 using a bus 106. The bus 106 may be or include any suitable interface or bus. For example, an ARM® Advanced Microcontroller Bus Architecture (AMBA®) interface, such as the Advanced eXtensible Interface (AXI), may be used.

The storage controller 102 may include instructions or may be otherwise configured, for example hard-coded or hard-wired, to transmit pixel data associated with given pixel locations to corresponding storage banks 108 of the storage 104 and/or to read data associated with certain pixel locations from corresponding storage banks 108. For example, the storage controller 102 may be used to distribute received pixel data amongst the storage banks 108 in a distribution pattern, which may be considered to be a particular pattern or order in which the pixel data is written to respective storage banks. For example, there may be a particular or predetermined mapping between pixel data associated with pixels of a two dimensional area of rows and columns of pixels and respective storage banks. In other words, pixel data associated with a particular pixel location may be written to the same storage bank over time, for example for different frames of a video. This may allow the pixel data to be accessed more rapidly than other systems in which a storage controller is not arranged to write pixel data to storage banks according to a distribution pattern.

The storage 104 may include at least one of volatile memory and non-volatile memory. For example, the storage may include a Random Access Memory (RAM), for example Static RAM (SRAM) or Dynamic RAM (DRAM) or a Read Only Memory (ROM). The storage 104 may be removable or non-removable from a system coupled to the storage 104, such as an image processing system.

As explained above, the storage 104 includes a plurality of storage banks 108. In the example of FIG. 1, there are sixteen storage banks 108, each of which is labelled with a different letter from A to P, although in other examples the storage 104 may include more or fewer storage banks. Each storage bank typically includes a plurality of different memory or storage locations, each of which may correspond to a different respective address. For example, each storage bank of the plurality of storage banks 108 may correspond to a separate memory, for example with its own address and data paths. Each storage bank may therefore be accessed simultaneously or substantially simultaneously as each other storage bank of the plurality of storage banks 108, for example such that there is an overlapping time period during which all of the storage banks 108 is addressed, even if access to each individual storage bank begins and finishes at a different time to each other storage bank. For example, each storage bank may be a separate SRAM memory, with a separate address and data bus.

The storage 104 is configured to receive, in raster order, pixel data corresponding to a two dimensional area including a plurality of rows and columns of input pixels. The two dimensional area may represent a larger part or portion of an input image than the output block. For example, the two dimensional area may be the entirety of an input image or frame or an entire sub-window of an input image or frame. The pixel data may be received at the storage 104 from a further storage, memory or cache (not shown in FIG. 1 but illustrated in FIG. 4), which may be an external storage or memory with a larger capacity than the storage 104. While in this example, the further storage is considered to be separate from the storage 104, in other examples the further storage may be considered to form part of the storage 104.

The pixel data may represent a still, stationary or non-moving image or a moving or video image. For example, the pixel data may represent a frame of a video. The pixel data may be in any suitable format and for example may represent an intensity of respective pixels of the two dimensional area. For example, where the pixel data represents a frame of a video, the video may be an encoded or a decoded video. For example, the video may be encoded using an encoding method such as H.264 or H.265 encoding and may be decoded prior to receipt by the storage 104.

The video may include one or more color channels. For example, the video may be monochrome, with pixels of a frame of the video varying from white to black via intermediate greyscale colors or intensities. Alternatively, the video may be a color video, with multiple color channels. Each color channel may be stored on a separate plane (or array of intensity values), or multiple color channels may share the same plane.

The video may for example be encoded using chroma subsampling, in which a lower resolution is used for chroma information (for example representing the color of a frame) than for luma information (for example representing the brightness of the frame), in view of the lower sensitivity of the human visual system for color differences compared to luminance differences. For example, the pixel data may be in the form of YUV 4:2:0 data (where Y represents the luma of the color, U represents the difference between the blue component of the color and the luma and V represents the difference between the red component of the color and the luma). As the skilled person will appreciate, the 4:2:0 subsampling scheme indicates a horizontal sampling reference of 4, two chrominance samples in the first row of 4 rows (as the horizontal sampling reference is 4), and zero changes in chrominance samples between the first and second row of 4 pixels.

Where the pixel data is YUV 4:2:0 data, a planar format sometimes referred to as YV12 may be used. In this format, the pixel data is separated into 3 planes, with Y, U and V planes each stored in a separate location (for example at a separate address) in memory. Another suitable format for YUV 4:2:0 data is the semi-planar NV12 format, in which the pixel data is separated into 2 planes. A first plane (corresponding to a first address in memory) stores the Y plane, and a second plane (corresponding to a second address in memory) stores the U and V plane. In the second plane, the data corresponding to the U values may be stored in the least significant bits (corresponding to low address values) and the data corresponding to the V values may be stored in the most significant bits (corresponding to higher address values).

Typically the resolution of an input frame is up to 4096 pixels by 2160 pixels, although higher resolutions may be possible. In such cases, the two dimensional area may include 4096 rows and 2160 columns or may include fewer than 4096 rows and/or fewer than 2160 columns. For example, the two dimensional area may include a subset of rows or columns of the input frame, which may correspond to an input tile of the input frame.

Where the pixel data represents a still image, the still image may be in the JPEG (Joint Photographic Experts Group, ISO/IEC 10918) or JPEG XT (ISO/IEC 18477) formats. In such cases, the pixel data may include the intensity values of each pixel of the two dimensional area of the image, which may be stored with a greyscale or brightness level of, for example, from 0 to 255 per color band or color channel. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. The pixel data may also include color data, relating to the color of the pixel represented by the pixel data. For example, when the image is a color image, a pixel value of an intensity or brightness for each pixel may be stored separately for each color channel. If a pixel is represented by, for example, three primary colors such as in the RGB (red, green, blue) or YUV color spaces, the visual appearance of each pixel may be represented by three intensity values, one for each primary color.

As will be appreciated by the skilled person, the pixel data may use any suitable representation, which may be different from the examples set out above, which are merely illustrative. For example, the pixel data may represent other features or characteristics of the pixels of the two dimensional area than the pixel intensity, such as locations of the pixels of the two dimensional area, which may be used for interpolation of a pixel location rather than a pixel intensity value.

Figure 2:
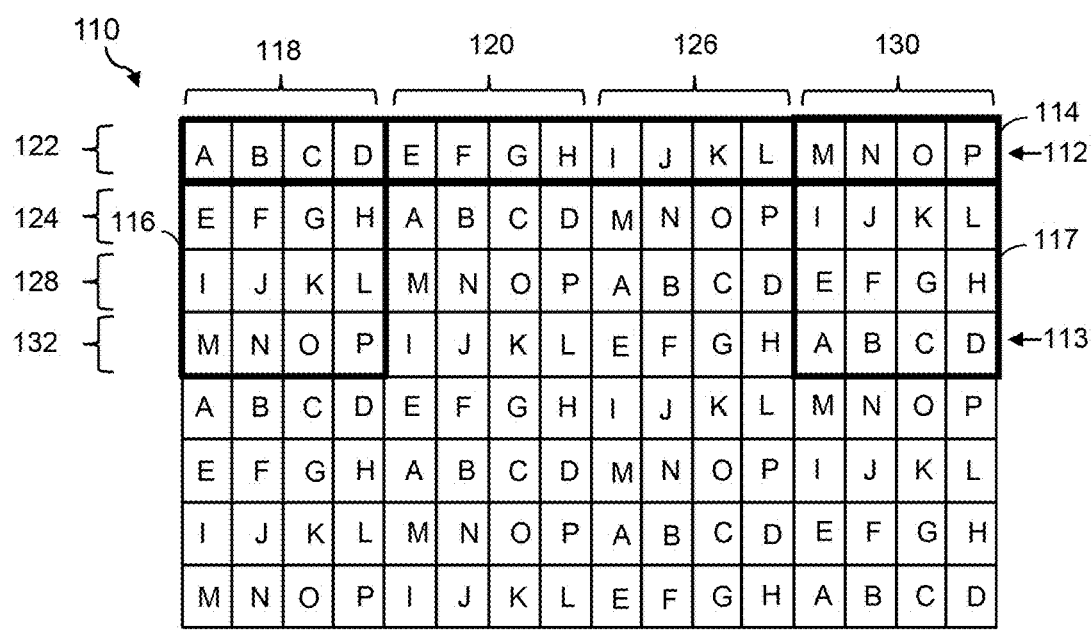
FIG. 2 is a schematic illustration of an example of a distribution pattern for use with the storage system of FIG. 1.

FIG. 2 illustrates schematically an example of a distribution pattern for use with the storage system 100 of FIG. 1. FIG. 2 shows a two dimensional area 110, which includes sixteen columns and eight rows of pixels. As will be appreciated, this is a simplified example; in practice, the two dimensional area 110 may include more than sixteen columns and eight rows of pixels. The storage bank of the storage banks 108 of the FIG. 1 that the pixel data of each pixel of the two dimensional area 110 is written to is labelled in FIG. 2 with a letter representing a storage bank. For example, pixel data for the top left corner pixel is written to storage bank A and pixel data for the bottom right corner pixel is written to storage bank D.

As described above with reference to FIG. 1, the storage 104 receives pixel data corresponding to the two dimensional area 110 in raster order. Thus, for a first row of received pixel data, representing a first row of pixels 112 of the two dimensional area 110, the pixel data is received sequentially for each pixel. In this example, the first row of pixels 112 includes sixteen pixels and there are sixteen different storage banks (labelled from A to P). The horizontal distribution pattern section 114, which is surrounded by a thick line in FIG. 2 also includes sixteen pixels. Thus, FIG. 2 is an example in which the horizontal distribution pattern section includes the same number of pixels as there are different storage banks in the storage 104. In other examples, however, the horizontal distribution pattern section may include more pixels than the number of different storage banks.

In the example of FIG. 2, the pixel data corresponding to pixels of the first row of pixels 112 is written into the different storage banks 108 according to a distribution pattern, such that pixel data of each pixel is written into a different storage bank than the pixel data of each other pixel of the first row of pixels 112. In this example, the pixel data corresponding to the first pixel is written to storage bank A, the pixel data corresponding to the second pixel is written to storage bank B, the pixel data corresponding to the third pixel is written to storage bank C and so on until the pixel data corresponding to the sixteenth pixel is written to storage bank P.

In the example of FIG. 2, each storage bank of the plurality of storage banks 108 stores pixel data from a first limited number of pixels in the horizontal distribution pattern section 114, which in this example is one (as the size of the horizontal pattern section is sixteen and there are sixteen storage banks). If, however, the horizontal distribution pattern section included thirty two pixels rather than sixteen, each storage bank would store pixel data from two pixels in the horizontal distribution pattern section (and so on for horizontal distribution pattern sections of other different sizes). In some examples, the horizontal distribution pattern section may not be equally divisible by the number of storage banks. In such cases, some storage banks may store pixel data for a larger number of horizontal distribution pattern sections than other storage banks.

In examples, the storage system is operable to write data for the whole of the horizontal distribution pattern section in a limited number of write cycles corresponding to the first limited number of pixels which each of the plurality of storage banks stores in the horizontal distribution pattern section. For example, the first limited number may be one. In this case, the storage system may be operable to write data for the whole of the horizontal distribution pattern section in a single write cycle.

FIG. 2 shows such an example. In FIG. 2, the pixel data for the first row 112 may be received and written in one write cycle to each of storage blocks A to P in parallel, for example substantially simultaneously or within the duration of the write cycle. This can improve the speed of writing the pixel data to the storage 104.

In examples, the storage system is responsive to a clock defining a clock cycle. In these examples, the write cycle may correspond to a single clock cycle. For example, the clock may be a system clock. Alternatively, if the storage (or the storage banks) is a single port memory, such as a multi-channel single port memory with one read port and one write port, the storage system may be responsive to the clock of the read port and the write port.

In the distribution pattern 110 illustrated in FIG. 2, pixel data of pixels in a two dimensional distribution pattern block 116 is also written to different ones of the plurality of storage banks 108. In this example distribution pattern 110, the two dimensional distribution pattern block 116 is a four-by-four block of pixels, including four columns and four rows of pixels. This is not intended to be limiting, though; in other examples, the two dimensional distribution pattern block may be of a different size and may be non-square block, with the number of columns in the block differing from the number of pixels in the block.

The horizontal distribution pattern section 114 of FIG. 2 includes a first section part 118, which overlaps the two dimensional distribution pattern block 116 and a second section part 120, which does not overlap the two dimensional distribution pattern block 116. Pixel data of the first section part 118 is written to a first set of storage banks, which in this example includes storage banks A to D. Pixel data of the second section part 120 is written to a second set of storage banks, which in this example includes storage banks E to H.

In the example of FIG. 2, the two dimensional distribution pattern block 116 includes a first block part 122, which overlaps the horizontal distribution pattern section 114, and a second block part 124, which does not overlap the horizontal distribution pattern section 114. In this example, the first block part 122 also overlaps the first section part 118; the pixels of the first block part 122 also belong to the first section part 118. The pixel data of the first block part 122 is therefore also written to the first set of storage banks, A to D. Pixel data of the second block part 124 is written to the second set of storage banks, E to H.

In FIG. 2, the horizontal distribution pattern section 114 includes a third section part 126, which does not overlap the two dimensional distribution pattern block 116 and the two dimensional distribution pattern block 116 includes a third block part 128, which does not overlap the horizontal distribution pattern section 114. Pixel data of the third section part 126 and pixel data of the third block part 128 are both written to a third set of storage banks, I to L, which are different from the first set of storage banks, A to D, and different from the second set of storage banks, E to H. The horizontal distribution pattern section 114 of FIG. 2 also includes a fourth section part 130, which does not overlap the two dimensional distribution pattern block 116. The two dimensional distribution pattern block 116 of FIG. 2 includes a fourth block part 132, which does not overlap the horizontal distribution pattern section 114. Pixel data of the fourth section part 130 and pixel data of the fourth block part 132 are both written to a fourth set of storage banks, M to P, different from the first, second and third sets of storage banks.

In other examples, however, the horizontal distribution pattern section and/or the two dimensional distribution pattern block may include more or fewer section parts or block parts, respectively. Furthermore, the section parts or block parts may be distributed to different sets of storage banks, or the sets of storage banks may include more or fewer than four storage banks, or some of the sets of storage banks may include more storage banks than other sets of storage banks.

Thus, in examples such as FIG. 2, pixel data of the horizontal distribution pattern section 114 and the two dimensional pattern block 116 are written to the same sets of storage banks, in this case storage banks A to P.

Each of the plurality of storage banks may store pixel data from a second limited number of pixels in the two dimensional distribution pattern block 116. In the example of FIG. 2, each of the storage banks A to P stores, respectively, pixel data from one pixel of the two dimensional distribution pattern block 116. However, in cases in which the number of pixels in the two dimensional distribution pattern block is larger than the number of storage banks, each of the storage banks may store pixel data from more than one pixel of the two dimensional distribution pattern block 116.

The selected two dimensional output block may correspond with the two dimensional pattern block 116. For example, the selected two dimensional output block may be of a predetermined size, which may depend on the processing to be applied to the output block. In examples such as these, for example FIG. 2, the storage system is operable to read data for the whole of the selected two dimensional output block in a limited number of read cycles corresponding to the second limited number of pixels which each of the plurality of storage banks 108 stores in the two dimensional distribution pattern block 116. For example, where the second limited number of pixels is one, and each of the plurality of storage banks stores pixel data from one pixel in the two dimensional distribution pattern block 116, the storage system may be operable to read data for the whole of the selected two dimensional output block in a single read cycle. As explained above with reference to writing data into the horizontal distribution pattern section 114, the storage system 100 may be responsive to a clock defining a clock cycle. In such cases, the read cycle may correspond to a single clock cycle, such that the storage system is operable to read data for the whole of the selected two dimensional output block in a single clock cycle.

In the example of FIG. 2, the distribution pattern 110 is such that the storage system 100 is operable to both write data into the whole of the horizontal distribution pattern section 114 in a single clock cycle and to read data for the whole of the selected two dimensional output block in a single clock cycle (for example in a clock cycle after or subsequent to the clock cycle used for writing the data into the horizontal distribution pattern section 114). The writing and reading of this data may therefore be performed in fewer clock cycles than in other systems that involve multiple clock cycles to write pixel data from a section of a row of pixels corresponding to an output block or that involve multiple clock cycles to read pixel data from the output block.

In examples such as that of FIG. 2, the two dimensional output block corresponds to an n by n block of pixels, where n is an integer, and the storage includes m storage banks, where m is an integer equal to n×n. In FIG. 2, n is equal to 4. However, in other examples, the two dimensional output block may correspond to a block of pixels with more or fewer columns than rows, and n may be more or less than 4.

After the pixel data of the selected two dimensional output block is read, a multiplexing procedure may be performed, in which the pixel values from the different memory banks are associated with their corresponding location in the selected two dimensional output block.

In some examples, the multiplexing procedure may instead involve associating other data than the pixel data with a corresponding location. For example, as described further below, an interpolation process may be performed on a selected two dimensional output block (which may correspond with a two dimensional distribution pattern block). Such an interpolation may involve processing pixel data with a function, such as one or more polyphase filters. Coefficients of such polyphase filters may have been pre-calculated and may depend on the location of an input pixel. For example, for a four pixel by four pixel output block, there may be four filter coefficients and sixteen pixel values.

As can be seen in FIG. 2, the association between pixel locations and storage banks including pixel data of a respective pixel location may differ between different two dimensional distribution pattern blocks. In the example of FIG. 2, the storage banks A to D in the two dimensional distribution pattern block 116 store pixel data corresponding to the first row of pixels 112. However, in a further two dimensional distribution pattern block 117 of the distribution pattern 110 of FIG. 2, the storage banks A to D store pixel data corresponding to a fourth row of pixels 113 rather than the first row of pixels 112.

The correct association between pixel values of the storage banks of a particular two dimensional distribution pattern and their corresponding locations (and, hence, corresponding filter coefficients) may be made by altering the association between the locations and the pixel values (e.g. by corresponding the pixel data stored in storage bank A of the two dimensional distribution pattern block 116 with the top left pixel location and corresponding the pixel data stored in storage bank A of the further two dimensional distribution pattern block 117 with the bottom left pixel location).

However, in this case, as each interpolation may involve four filter coefficients and sixteen pixel values, it may be more efficient to alter an association between filter coefficient data and pixel data of particular storage banks rather than changing an association between pixel data of particular storage banks and pixel locations.

After the multiplexing, the pixel data of the selected two dimensional output block may be processed before being transferred to a further component of an image or data processing system, such as back to the storage system 100 or to a display device for display of an image based on the processed pixel data.

To simplify the reading of the data into the storage 104, the pixel data in the two dimensional distribution pattern block 116 may be written to the same storage address in respective storage banks of the different ones of said plurality of storage banks. For example, the pixel data of each of the pixels of the two dimensional distribution pattern block 116 of FIG. 2 may be written to a first address in each of storage banks A to P.

Figure 3:
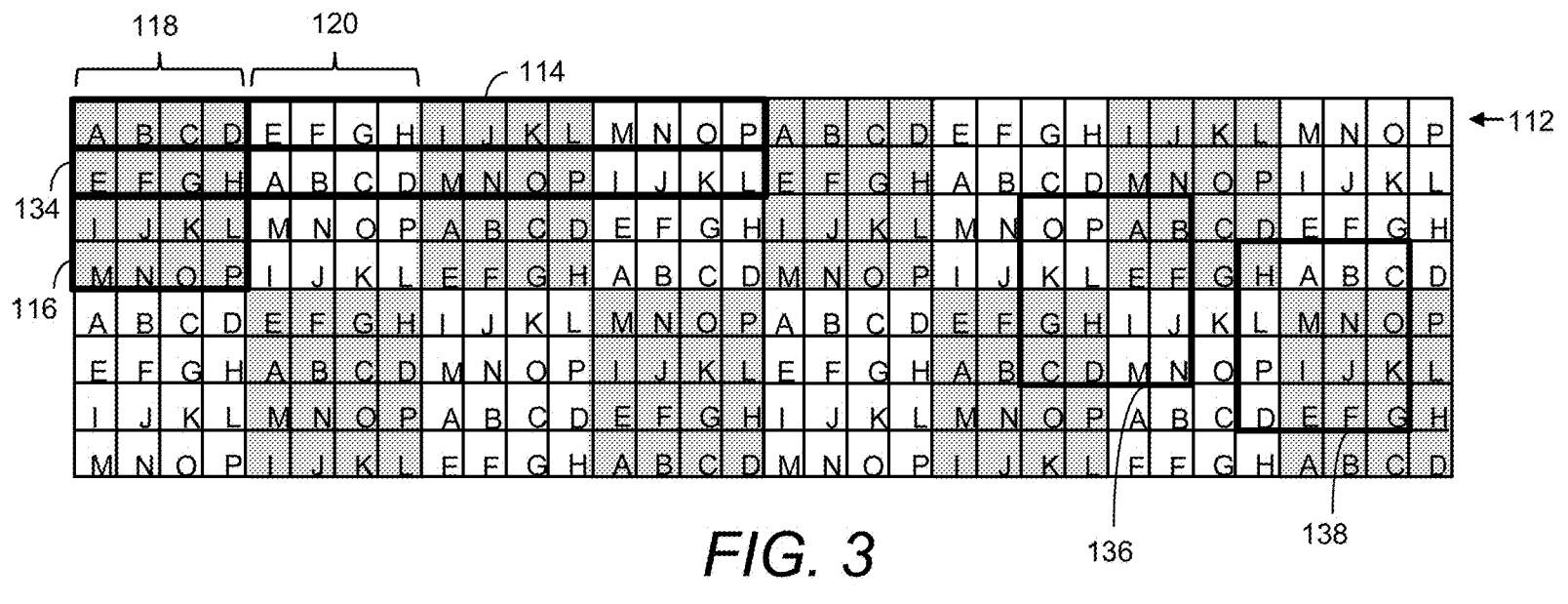

This is shown in more detail in FIG. 3, which shows a distribution pattern including the distribution pattern of FIG. 2. Features of FIG. 2 illustrated in FIG. 3 are labelled with the same reference numerals; corresponding descriptions are to be taken to apply. Labels for some of the features labelled in FIG. 2 are omitted in FIG. 3, for clarity.

In FIG. 3, pixel data for each four by four block of pixels with a continuous background color, one of which corresponds to the two dimensional distribution pattern block 116, is stored in the same address in each of the respective memory banks. For example, pixel data of the two dimensional distribution pattern block 116, which is shaded in grey, is stored in the same respective address in storage banks A to P. Similarly, pixel data for the four by four block of pixels immediately below the two dimensional distribution pattern block 116, with a white background color, is stored in the same respective address in storage banks A to P. This may simplify the accessing or reading of the pixel data from the storage blocks.

Hence, in examples such as that of FIG. 3, the first section part 118 of the horizontal distribution pattern section 114 is written to a first address in respective storage banks of the first set of storage banks, A to D, and the second section part 120 of the horizontal distribution pattern section 120 is written to a second address, different from the first address, in respective storage banks of the second set of storage banks, E to H.

The distribution pattern may differ for different rows of the two dimensional area of pixels. For example, the horizontal distribution pattern section may be a first horizontal distribution pattern section, the first horizontal distribution pattern section including a plurality of section parts in a first order, the plurality of section parts including the first section part and the second section part, pixel data of each one of said plurality of section parts being written to a different respective set of storage banks of said plurality of storage banks. The distribution pattern may also include a second horizontal pattern section corresponding to a different row of input pixels than the first horizontal pattern section, the second horizontal pattern section including the plurality of section parts of the first horizontal pattern section in a second order different from the first order, such that the second section part, the third section part or the fourth section part of the second horizontal pattern section overlaps the two dimensional distribution pattern block.

FIG. 3 shows such an example. In FIG. 3, the horizontal distribution pattern section 114 is a first horizontal distribution pattern section and there is a second horizontal distribution pattern section 134. Pixel data of the first section part 118 and the second section part 120 of the first horizontal distribution pattern section 114 is written to storage banks A to D and E to H respectively. In the first horizontal distribution pattern section 114, the first section part 118 and the second section part 120 are in a first order, with the first section part 118 first and the second section part 120 second, taken from the left side of the row. However, in the second horizontal distribution pattern section 134, which corresponds to the second row of pixels rather than the first row of pixels, the second section part, corresponding to storage banks E to H, is first and the first section part, corresponding to storage banks A to D, is second. In other words, the order of the section parts in the second horizontal distribution pattern section 134 is different from that of the first horizontal distribution pattern section 114. In FIG. 3, the second section part of the second horizontal distribution pattern section 134 therefore overlaps the two dimensional distribution pattern block 116. Similarly, other rows of the distribution pattern of FIG. 3 have a different order of section blocks horizontally than the first horizontal distribution pattern section 114.

By altering the order of the section parts of the horizontal distribution pattern sections, the distribution pattern may be arranged such that it is possible to read a plurality, for example any, two dimensional distribution pattern block, for example of a fixed size, in a limited number of write cycles. In the distribution pattern of FIG. 3, pixel data corresponding to any four by four two dimensional distribution pattern block can be read in a single read cycle, such as a single clock cycle. This is because, for any four by four two dimensional distribution pattern block of the distribution pattern of FIG. 3, the pixel data of each pixel is stored in a different respective storage block. This is shown in FIG. 3, in which a second two dimensional distribution pattern block 136 and a third two dimensional distribution pattern block 138 are labelled. As can be seen, although these are offset compared to the two dimensional distribution pattern block 116, pixel data for each pixel of these two dimensional distribution pattern blocks 136, 138 is nevertheless stored in a different storage bank than each other pixel of the same two dimensional distribution pattern block. In this example, the second two dimensional distribution pattern block 136 and the third two dimensional distribution pattern block 138 each include pixel data at four different addresses. This may be generalized in other examples: in other examples, pixel data of each two dimensional distribution pattern block of a size of n×n pixels, where n is an integer, may be stored at no more than n different addresses in each of the respective storage banks.

FIG. 3 also illustrates the writing of pixel data for pixels in a row including more pixels than the number of different storage banks. In the first row of pixels 112 of FIG. 3, pixel data of the first sixteen pixels is written, respectively, to storage banks A to P, as described with reference to FIG. 2. For the seventeenth pixel in the first row of pixels 112, none of the storage banks, A to P, is empty. Thus, for the seventeenth pixel, the pixel data is written into a storage bank of the storage banks that already includes data from a pixel of the first row of pixels. For example, the pixel data of the seventeenth pixel may be written to storage bank A, the pixel data corresponding to the eighteenth pixel may be written to storage bank B, the pixel data corresponding to the nineteenth pixel may be written to storage bank C and so on until the pixel data corresponding to the thirty-second pixel is written to storage bank P. Thus, in this case, each storage bank may store pixel data for a plurality of different pixels of the same row, up to the first limited number of pixels. Furthermore, as can be seen in FIG. 3, each storage bank may also store pixel data for a plurality of different pixels of different rows of the two dimensional area.

In examples such as FIG. 3, pixel data may be written to the storage banks according to the distribution pattern over a plurality of write cycles or clock cycles. Subsequent write cycles or clock cycles may then be used for reading the selected two dimensional output block. For example, in FIG. 3, two clock cycles may be used to write the pixel data for a row of pixels to the storage banks A to P. Thus, as the two dimensional distribution pattern section 116, which corresponds to the selected two dimensional output block, includes four rows of pixels in this example, the data corresponding to the two dimensional distribution pattern section 116 may be written, in raster order, over seven clock cycles. After these clock cycles (for example, after eight clock cycles, corresponding to the writing of the entire fourth row of pixels), the pixel data corresponding to the selected two dimensional output block may be read in the next or subsequent clock cycle. In other examples, though, pixel data corresponding to a larger number of rows of pixels than the number of rows included in the two dimensional distribution pattern section 116 may be written before the pixel data of the selected two dimensional output block is read.

Figure 4:
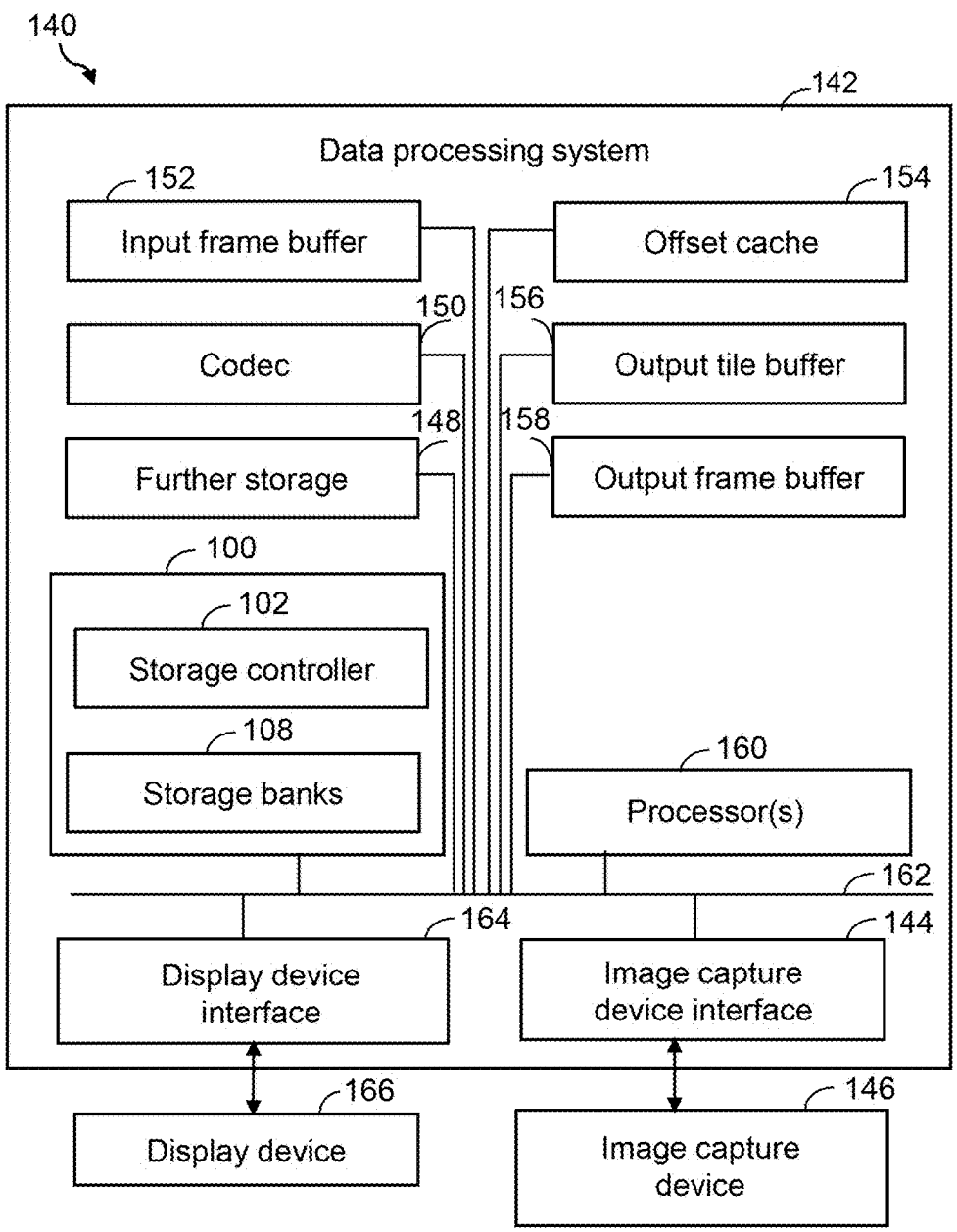
FIG. 4 is a schematic diagram showing an example of internal components of a data processing system.

An example of internal components of a system 140 which may be coupled to or include a storage system such as that described with respect to FIGS. 1 to 3 is shown schematically in FIG. 4, to put the example storage system in context, according to an example. The system 140 of FIG. 4 includes a data processing system 142. The data processing system 142 includes an image capture device interface 144 to retrieve data from an image capture device 146. The image capture device interface 144 may include software and/or hardware components. Although the data processing system 142 of FIG. 4 is shown as separate from but coupled to an image capture device 146, in other examples the data processing system 142 and the image capture device 146 may be integrated in one device.

The image capture device 146 may be any suitable device for capturing images, such as a camera or a video camera. As noted above, the image may be a still image, such as a frame of a video, or a moving image, such as a video.

The data processing system 142 of FIG. 4 includes the storage system 100 described with reference to FIGS. 1 to 3, as will be described further below. In other examples, though, all or part the storage system 100 may be separable or removable from the data processing system 142 rather than integrated in the data processing system 142.

In the example of FIG. 4, the data received at the image capture device interface 144 is stored in further storage 148 of the data processing system 142. The further storage 148 may have a larger capacity than the storage banks 108 of the storage system 100 and may therefore store an entire frame or multiple frames of a video captured by the image capture device 146. In contrast, the storage banks 108 may store a portion of a frame, such as a four pixel-by-four pixel output block. The further storage 148 may for example store pixel data in a compressed or encoded format such as video data encoded using H.264 or H.265 encoding or still image data encoded using the JPEG or JPEG XT compression algorithms. FIG. 4 shows such an example, in which the pixel data is encoded video data.

The data processing system 142 of FIG. 4 further includes a codec 150 for decoding the encoded data stored in the further storage 148. For example, the codec 150 may be arranged to reverse the encoding applied to obtain the encoded data.

In the example of FIG. 4, decoded data representing a frame of the video obtained by the image capture device 146 is stored in an input frame buffer 152. In this example, pixel data corresponding to a two dimensional area corresponding to a plurality of rows and columns of the input frame stored in the input frame buffer 152 is written to the storage system 100. For example, the two dimensional area may correspond with an input tile of the input frame, which may correspond with a portion of the input frame. Thus, in this example, the storage banks 108 may be considered to act as an input tile buffer. The pixel data of the two dimensional area is written into the storage banks for example as described above with reference to FIGS. 1 to 3.

In FIG. 4, pixel data corresponding to two dimensional output blocks comprising a plurality of rows and columns of output pixels selected from the input pixels of the two dimensional area is read from the storage banks 108. For example, pixel data corresponding to a selected two dimensional output block may be read from the storage banks 108 and the pixel data may be used to perform an interpolation to calculate a pixel value for an input location within the selected two dimensional output block for which a pixel value is not stored in the storage banks, such as a non-integer pixel location. For example, a bicubic interpolation, for example using at least one polyphase filter, may be applied to calculate the pixel value for the input location. The calculated pixel value for that input location may then be associated with an output location in an output frame. The output location may for example be an output location of an output tile corresponding to the input tile. The correspondence or mapping between the input location and the output location may be determined for example based on an interpolation, for example a spline interpolation from a pixel output location to a corresponding input location. The determination of the input location may for example be performed before the calculation of the pixel value for the input location, and data corresponding to the input location may be stored either in the storage system 100 or in a further storage, buffer or cache (not shown in FIG. 4).

Pixel data relating to incomplete output tiles is stored in an offset cache 154 in FIG. 4 and pixel data relating to complete output tiles is stored in an output tile buffer 156. Complete output tiles may be tessellated to form an output frame, which is stored in an output frame buffer 158.

At least one processor 160 is communicatively coupled to the various storage elements and buffers of the data processing system 142 of FIG. 4. The at least one processor 160 in the example of FIG. 4 may include a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The processor may be or include a graphics processing unit (GPU). A processor may also be implemented as a combination of computing devices, e.g., a combination of a DSP and a microprocessor, a plurality of microprocessors, one or more microprocessors in conjunction with a DSP core, or any other such configuration.

In addition to pixel data, data processing system 142 in the example of FIG. 4 may include computer program instructions configured to, when processed by the at least one processor 160, implement a method of processing the pixel data, for example to interpolate pixel values based on the selected two dimensional output block, as described above. The computer program instructions may be in any suitable format or language, for example in machine code, an assembly language or a register transfer language (RTL). The instructions may for example be included in a configuration bit stream for configuring the data processing system 142 to implement a desired method of processing the pixel data. Such instructions may be stored in the further storage 148 or the storage system 100 or other storage of the data processing system 142 for example.

The components of the data processing system 142 in the example of FIG. 4 are interconnected using a systems bus 162. This allows data to be transferred between the various components. For example, the output frame may be transferred via the systems bus 162 from the output frame buffer 158 to a display device interface 164 for transfer to a display device 166 for display.

The display device interface 164 may include a display port and/or an internal electronics interface, e.g. where the data processing system 142 and the display device 166 are part of the image capture device 146 such as a display screen of a security or monitoring system. Therefore, when instructed by the at least one processor 160 via the display device interface 164, the display device 166 may display the output frame.

In the example of FIG. 4, the pixel data is based on data obtained by an image capture device 146. In other examples, the data may not be obtained by an image capture device 146 but may instead be computer-generated images or video or other image or video data received by the data processing system, for example from a remote server device upon accessing a website.

Furthermore, in further examples, the pixel data may represent a still image rather than a frame of a moving image or video. In these examples, the input frame buffer may store an input image and the output frame buffer may store an output image after processing implemented by the at least one processor 160 of the data processing system 142.

The above examples are to be understood as illustrative examples. Further examples are envisaged.

Further examples relate to a method including receiving, in raster order, pixel data corresponding to a two dimensional area comprising a plurality of rows and columns of input pixels. The received pixel data is written to a storage including a plurality of storage banks to distribute the received pixel data amongst the storage banks in a distribution pattern. The storage is for example the same as or similar to the storage 104 of FIG. 1.

The distribution pattern in these examples may be the same as or similar to the distribution pattern 110 of FIGS. 2 and 3, and includes horizontal distribution pattern sections each of which corresponds to pixels from a row of the input pixels and two dimensional distribution pattern blocks each of which corresponds to pixels from a plurality of adjacent rows and a plurality of adjacent columns of the input pixels. The horizontal distribution pattern section includes a first section part, which overlaps the two dimensional distribution pattern block and a second section part, which does not overlap the two dimensional distribution pattern block.

In these examples, the writing includes writing pixel data in a horizontal distribution pattern section to different ones of the plurality of storage banks such that each of the plurality of storage banks stores pixel data from a first limited number of pixels in the horizontal distribution pattern section and such that pixel data of the first section part is written to a first set of storage banks of the plurality of storage banks and writing pixel data in a two dimensional distribution pattern block to different ones of the plurality of storage banks such that each of the plurality of storage banks stores pixel data from a second limited number of pixels in the two dimensional distribution pattern block and such that pixel data of the second section part is written to a second set of storage banks of the plurality of storage banks, different from the first set.

These examples further include outputting pixel data corresponding to a selected two dimensional output block including a plurality of rows and columns of output pixels selected from the input pixels.

For example, data may be written into the whole of the horizontal distribution pattern in a limited number of write cycles corresponding to the first limited number of pixels which each of the plurality of storage banks stores in the horizontal distribution pattern section. The first limited number may be one, in which case data may be written for the whole of the horizontal distribution pattern section in a single write cycle, for example a single clock cycle.

Similarly, the outputting of the pixel data may include reading data for the whole of the selected two dimensional output block in a limited number of read cycles corresponding to the second limited number of pixels which each of the plurality of storage banks stores in the two dimensional distribution pattern block. The second limited number may be one and the data for the whole of the selected two dimensional output block in a single write cycle, for example a single clock cycle.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A storage system configured to:
   receive, in raster order, pixel data corresponding to a two dimensional area comprising a plurality of rows and columns of input pixels; and
   output pixel data corresponding to a selected two dimensional output block comprising a plurality of rows and columns of output pixels selected from the input pixels,
   the storage system comprising:
   storage including a plurality of storage banks; and a storage controller circuitry operable to control writing of the received pixel data to the storage to distribute the received pixel data amongst the storage banks in a distribution pattern, wherein the distribution pattern includes:
a) horizontal distribution pattern sections, each of which corresponds to pixels from a row of the input pixels; and
b) two dimensional distribution pattern blocks, each of which corresponds to pixels from a plurality of adjacent rows and a plurality of adjacent columns of the input pixels, and wherein:

pixel data in a first horizontal distribution pattern section of the horizontal distribution pattern sections are written to different ones of said plurality of storage banks such that each of said plurality of storage banks stores pixel data from a first limited number of pixels in said first horizontal distribution pattern section;

pixel data in a two dimensional distribution pattern block of the two dimensional distribution pattern blocks are written to different ones of said plurality of storage banks such that each of said plurality of storage banks stores pixel data from a second limited number of pixels in said two dimensional distribution pattern block;

the first horizontal distribution pattern section includes a plurality of section parts in a first order, the plurality of section parts including:
a first section part, which overlaps said two dimensional distribution pattern block; and
a second section part, which does not overlap said two dimensional distribution pattern block,
pixel data of each one of said plurality of section parts being written to a different respective set of storage banks of said plurality of storage banks; and a second horizontal distribution pattern section of the horizontal distribution pattern sections, which corresponds to a different row of the input pixels than the first horizontal distribution pattern section, includes a plurality of section parts corresponding to the plurality of section parts of the first horizontal distribution pattern section, the plurality of section parts of the second horizontal distribution pattern section comprising:
a first section part corresponding to the first section part of the first horizontal distribution pattern section; and
a second section part corresponding to the second section part of the first horizontal distribution pattern section,
wherein the plurality of section parts of the second horizontal distribution pattern section are in a second order different from the first order, such that the second section part of the second horizontal distribution pattern section overlaps the two dimensional distribution pattern block.

2. The storage system according to claim 1, wherein, for the first horizontal distribution pattern section, pixel data of the first section part of the first horizontal distribution pattern section is written to a first set of storage banks of said plurality of storage banks, and pixel data of the second section part of the first horizontal distribution pattern section is written to a second set of storage banks of said plurality of storage banks, different from said first set of storage banks, the two dimensional distribution pattern block includes a first block part, which overlaps said first horizontal distribution pattern section, and a second block part, which does not overlap said first horizontal distribution pattern section, pixel data of the second block part being written to said second set of storage banks.

3. The storage system according to claim 2, wherein:
the first horizontal distribution pattern section includes a third section part, which does not overlap said two dimensional distribution pattern block;
the two dimensional distribution pattern block includes a third block part, which does not overlap said first horizontal distribution pattern section; and
pixel data of said third section part of the first horizontal distribution pattern section and pixel data of said third block part are both written to a third set of storage banks, different from said first and second sets of storage banks.

4. The storage system according to claim 3, wherein:
the first horizontal distribution pattern section includes a fourth section part, which does not overlap said two dimensional distribution pattern block;
the two dimensional distribution pattern block includes a fourth block part, which does not overlap said first horizontal distribution pattern section; and
pixel data of said fourth section part of the first horizontal distribution pattern section and pixel data of said fourth block part are both written to a fourth set of storage banks, different from said first, second and third sets of storage banks.

5. The storage system according to claim 1, wherein the storage system is operable to write data for the whole of said first horizontal distribution pattern section in a limited number of write cycles corresponding to said first limited number of pixels which each of said plurality of storage banks stores in said first horizontal distribution pattern section.

6. The storage system according to claim 5, wherein said first limited number of pixels is one and the storage system is operable to write data for the whole of said first horizontal distribution pattern section in a single write cycle.

7. The storage system according to claim 6, wherein the storage system is responsive to a clock defining a clock cycle and the write cycle corresponds to a single clock cycle.

8. The storage system according to claim 1, wherein the storage system is operable to read data for the whole of said selected two dimensional output block in a limited number of read cycles corresponding to said second limited number of pixels which each of said plurality of storage banks stores in said two dimensional distribution pattern block.

9. The storage system according to claim 8, wherein said second limited number of pixels is one and the storage system is operable to read data for the whole of said selected two dimensional output block in a single read cycle.

10. The storage system according to claim 9, wherein the storage system is responsive to a clock defining a clock cycle and the read cycle corresponds to a single clock cycle.

11. The storage system according to claim 1, wherein the pixel data in the two dimensional distribution pattern block is written to the same storage address in respective storage banks of the different ones of said plurality of storage banks.

12. The storage system according to claim 1, wherein, for the first horizontal distribution pattern section, pixel data of the first section part of the first horizontal distribution pattern section is written to a first address in respective storage banks of a first set of storage banks of the plurality of storage banks and pixel data of the second section part of the first horizontal distribution pattern section is written to a second address, different from the first address, in respective storage banks of a second set of storage banks of the plurality of storage banks.

13. The storage system according to claim 1, wherein the selected two dimensional output block corresponds to an n by n block of pixels, where n is an integer, and the storage includes m storage banks, where m is an integer equal to n×n.

14. A method comprising:
receiving, in raster order, pixel data corresponding to a two dimensional area comprising a plurality of rows and columns of input pixels;
writing the received pixel data to a storage including a plurality of storage banks to distribute the received pixel data amongst the storage banks in a distribution pattern,
wherein the distribution pattern includes:
a) horizontal distribution pattern sections each of which corresponds to pixels from a row of the input pixels; and
b) two dimensional distribution pattern blocks each of which corresponds to pixels from a plurality of adjacent rows and a plurality of adjacent columns of the input pixels,
wherein the writing includes:
writing pixel data in a first horizontal distribution pattern section of the horizontal distribution pattern sections to different ones of said plurality of storage banks such that each of said plurality of storage banks stores pixel data from a first limited number of pixels in said first horizontal distribution pattern section; and
writing pixel data in a two dimensional distribution pattern block of the two dimensional distribution pattern blocks to different ones of said plurality of storage banks such that each of said plurality of storage banks stores pixel data from a second limited number of pixels in said two dimensional distribution pattern block;
wherein the first horizontal distribution pattern section of the horizontal distribution pattern sections includes a plurality of section parts in a first order, the plurality of section parts including:
a first section part, which overlaps said two dimensional distribution pattern block; and
a second section part, which does not overlap said two dimensional distribution pattern block; and
a second horizontal distribution pattern section of the horizontal distribution pattern sections, which corresponds to a different row of the input pixels than the first horizontal distribution pattern section, includes a plurality of section parts corresponding to the plurality of section parts of the first horizontal distribution pattern section, the plurality of section parts of the second horizontal distribution pattern section comprising:
a first section part corresponding to the first section part of the first horizontal distribution pattern section; and
a second section part corresponding to the second section part of the first horizontal distribution pattern section,
wherein the plurality of section parts of the second horizontal distribution pattern section are in a second order different from the first order, such that the second section part of the second horizontal distribution pattern section overlaps the two dimensional distribution pattern block; and
outputting pixel data corresponding to a selected two dimensional output block comprising a plurality of rows and columns of output pixels selected from the input pixels.

15. The method according to claim 14, wherein, for the first horizontal distribution pattern section, pixel data of the first section part of the first horizontal distribution pattern section is written to a first set of storage banks of said plurality of storage banks, and pixel data of the second section part of the first horizontal distribution pattern section is written to a second set of storage banks of said plurality of storage banks, different from said first set of storage banks, the two dimensional distribution pattern block includes a first block part, which overlaps said first horizontal distribution pattern section, and a second block part, which does not overlap said first horizontal distribution pattern section,
the writing including writing pixel data of the second block part to said second set of storage banks.

16. The method according to claim 14, wherein the writing includes writing data into the whole of said first horizontal distribution pattern section in a limited number of write cycles corresponding to said first limited number of pixels which each of said plurality of storage banks stores in said first horizontal distribution pattern section.

17. The method according to claim 16, wherein said first limited number of pixels is one and the writing includes writing data for the whole of said first horizontal distribution pattern section in a single write cycle.

18. The method according to claim 14, wherein the outputting the pixel data comprises reading data for the whole of said selected two dimensional output block in a limited number of read cycles corresponding to said second limited number of pixels which each of said plurality of storage banks stores in said two dimensional distribution pattern block.

19. The method according to claim 18, wherein said second limited number of pixels is one and the reading data includes reading data for the whole of said selected two dimensional output block in a single read cycle.

20. The method according to claim 14, wherein the selected two dimensional output block corresponds to an n by n block of pixels, where n is an integer, and the storage includes m storage banks, where m is an integer equal to n×n.

* * * * *